(12) United States Patent
Kobayashi

(10) Patent No.: US 11,062,464 B2
(45) Date of Patent: Jul. 13, 2021

(54) IMAGE PROCESSING APPARATUS, METHOD, AND STORAGE MEDIUM TO DERIVE OPTICAL FLOW

(71) Applicant: CANON KABUSHIKI KAISHA, Tokyo (JP)

(72) Inventor: Masaaki Kobayashi, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 16/413,369

(22) Filed: May 15, 2019

(65) Prior Publication Data

US 2019/0362505 A1 Nov. 28, 2019

(30) Foreign Application Priority Data

May 22, 2018 (JP) .............................. JP2018-097655

(51) Int. Cl.
| | |
|---|---|
| *G06T 7/246* | (2017.01) |
| *G06T 7/269* | (2017.01) |
| *G06T 3/40* | (2006.01) |
| *G06T 3/00* | (2006.01) |
| *G06T 5/00* | (2006.01) |
| *G06T 5/50* | (2006.01) |
| *G06T 7/00* | (2017.01) |

(52) U.S. Cl.
CPC ............ *G06T 7/248* (2017.01); *G06T 3/0093* (2013.01); *G06T 3/40* (2013.01); *G06T 5/002* (2013.01); *G06T 5/50* (2013.01); *G06T 7/269* (2017.01); *G06T 7/97* (2017.01); *G06T 2207/10016* (2013.01); *G06T 2207/20016* (2013.01); *G06T 2207/20072* (2013.01)

(58) Field of Classification Search
None
See application file for complete search history.

(56) References Cited

U.S. PATENT DOCUMENTS

| | | | | |
|---|---|---|---|---|
| 2008/0170124 A1* | 7/2008 | Hatanaka | ........... | H04N 5/23248 348/208.4 |
| 2010/0284626 A1* | 11/2010 | Malm | ....................... | G06T 5/40 382/261 |
| 2013/0235201 A1* | 9/2013 | Kiyohara | .................. | G06T 7/20 348/148 |

OTHER PUBLICATIONS

Bouguet (Pyramidal Implementation of the Lucas Kanade Feature Tracker Description of the Algorithm, https://web.archive.org/web/20170623013914/robots.stanford.edu/cs223b04/algo_tracking.pdf, published Jun. 23, 2017, retrieved from the Interneton Sep. 25, 2020) (Year: 2017).*

(Continued)

*Primary Examiner* — Leon Viet Q Nguyen
(74) *Attorney, Agent, or Firm* — Canon U.S.A., Inc. IP Division

(57) ABSTRACT

An image processing apparatus that derives an optical flow which is a set of motion vectors of at least a part of pixels between a plurality of input images includes an acquisition unit and a deriving unit. The acquisition unit is configured to acquire a contrast value of one of the input images. The deriving unit is configured to derive the optical flow based on the contrast value acquired by the acquisition unit and an energy function. The energy function includes a data term specifying a correlation between the plurality of input images and a smoothing term specifying a degree of smoothing.

19 Claims, 10 Drawing Sheets

(56) References Cited

OTHER PUBLICATIONS

Burce, D. Lucas et al.; "An Iterative Image Registration Technique with an Application to Stereo Vision;" Proc 7th Intl Joint Conf on Artificial Intelligence (IJCAI) 1981, Aug. 24-28; Vancouver, Bristish Columbia, pp. 674-679; (a more complete version is available as Proceedings of Imaging Understanding Workshop, pp. 121-130).
Jean-Yves Bouguet; "Pyramidal Implementation of the Lucas Kanade Feature Tracker Description of the algorithm;" http://robots.Stanford.edu/cs223b04/algo_tracking.pdf; pp. 1-9.

* cited by examiner

FIG.2
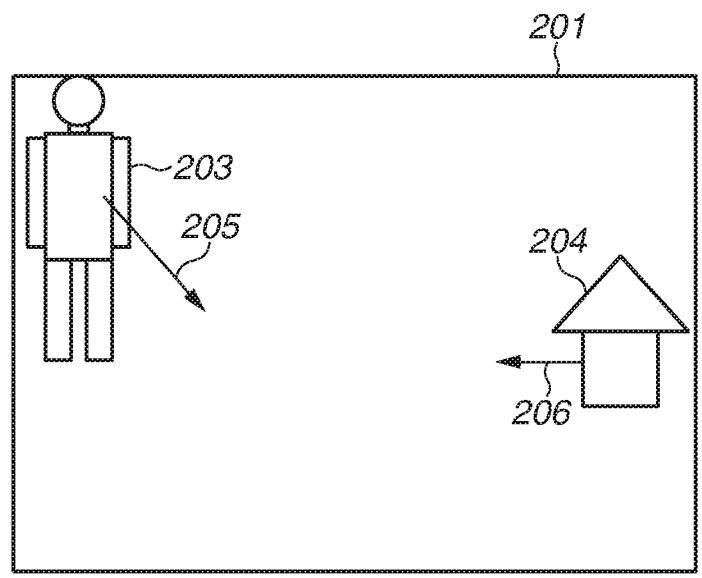
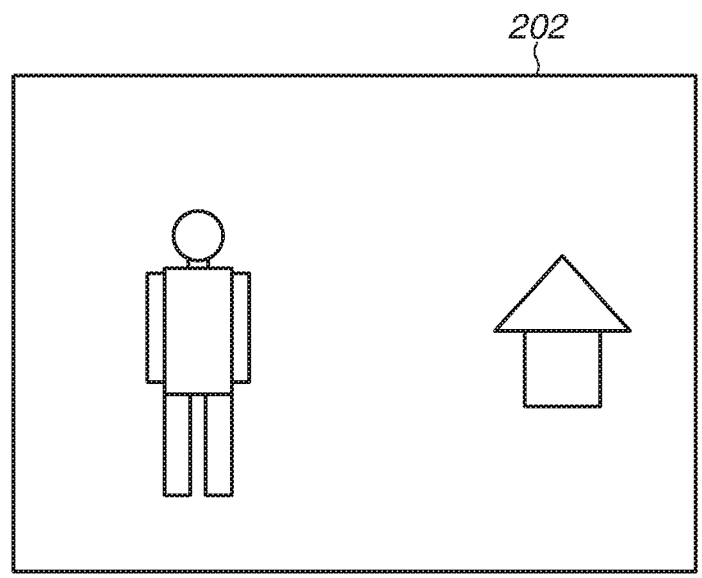

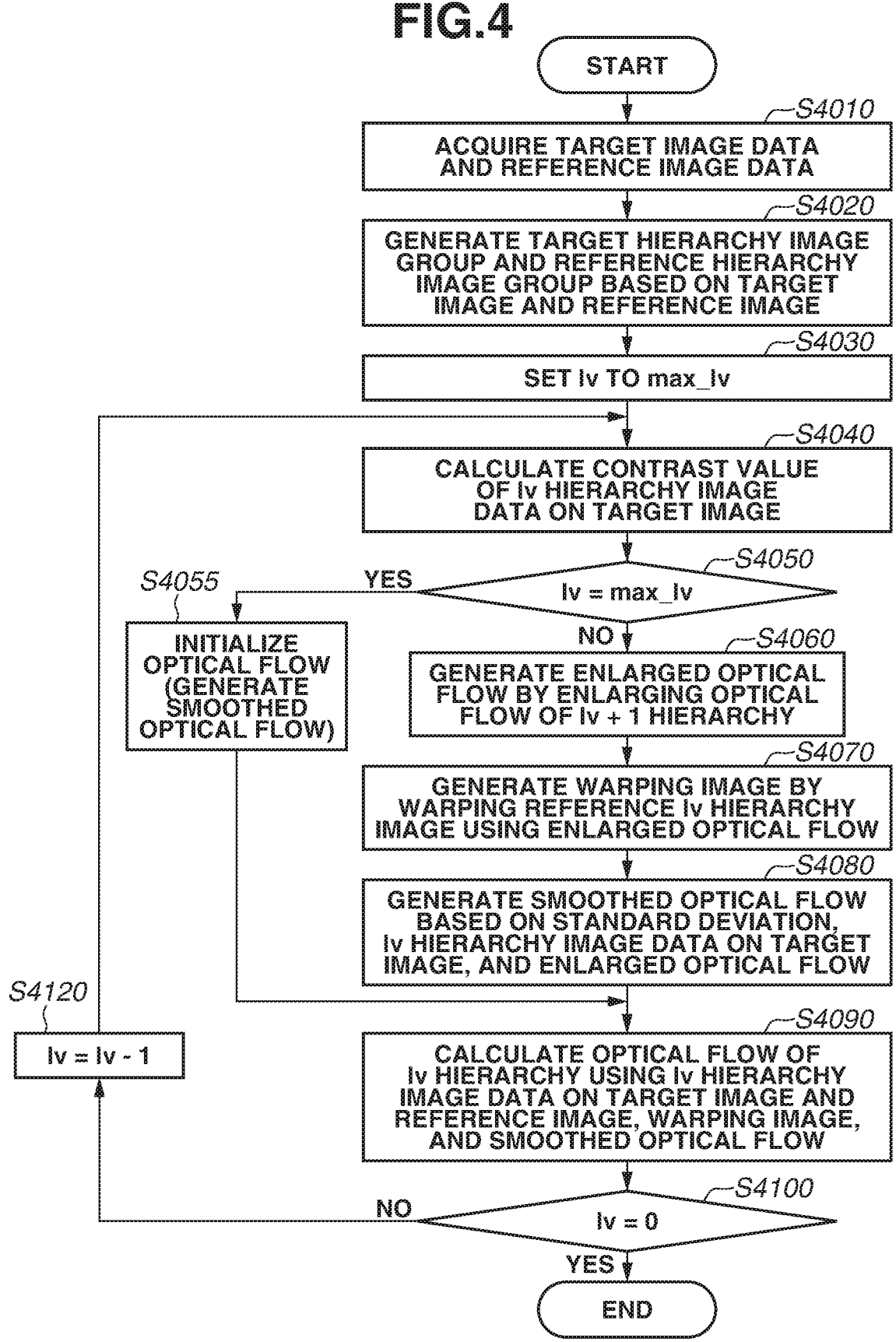

IMAGE PROCESSING APPARATUS, METHOD, AND STORAGE MEDIUM TO DERIVE OPTICAL FLOW

BACKGROUND

Field

One disclosed aspect of the embodiments relates to an image processing apparatus that derives an optical flow of an input image, an image processing method, and a storage medium.

Description of the Related Art

In recent years, a technique for associating pixels between images is increasingly important. The association refers to the relationship between a pixel of a target image and a pixel of a reference image that is considered to correspond to the pixel of the target image, and the association can be expressed by the coordinates of two points. In a case in which a stereo or multi-viewpoint image is input, the depth to an object is calculable from a correspondence relationship between pixels, so that the correspondence relationship is applicable to three-dimensional image processing is also possible. Further, a motion vector is obtainable by inputting non-consecutively-captured images (moving image) and representing the correspondence relationship between the input images as relative coordinates. Use of a set of motion vectors of at least some of the pixels between the plurality of input images (hereinafter, the set will be referred to as "optical flow") enables moving object tracking, moving image vibration control, and frame interpolation.

A gradient method and a template matching method are commonly-used methods for deriving an optical flow.

In the gradient method, an optical flow is calculated from the direction and magnitude of a change in luminance in space-time of pixels. A basic concept of the gradient method is to calculate an optical flow from an average change in luminance in the space-time of the pixels in a patch having a target pixel at the center thereof based on the assumption that pixels neighboring the target pixel are of the same motion. A commonly-used method is a Lucas Kanade method (hereinafter, referred to as "LK Method"). In the LK method, an image correlation between patches before and after a movement is expressed by the sum of squared difference (SSD), and a Taylor series expansion is performed on the SSD to minimize the SSD. Specifically, an equation for deriving an amount of movement having the highest correlation is solved. This amount of movement is a motion of a target pixel. At this time, a calculation formula that specifies the image correlation is referred to as "data term". In a case of deriving a motion from the data term alone, if the images contain a distortion, a correct correlation cannot be obtained. Further, there is a case in which a solution is not uniquely determined due to the presence of a plurality of amounts of movement having a high correlation. Thus, a method is used in which the data term and a smoothing term specifying the smoothing (continuousness, smoothness) level of an optical flow are weight averaged (weight added) and an amount of movement at which an energy function is minimized is calculated using the obtained sum as the energy function. A method using a smoothing term is discussed in B. D. Lucas and T. Kanade (1981), an iterative image registration technique with an application to stereo vision Proceedings of Imaging Understanding Workshop, pages 121-130.

Further, since the gradient method is only capable of deriving a small motion, a pyramid image including a plurality of reduced images is sometimes used. An optical flow derived from reduced images is used as an initial value for a one-level larger image so that large motions are detected from the reduced images while a difference between the motions detected from the reduced images, i.e., a motion vector with greater accuracy, is derived from the larger image. A commonly-used method is discussed in Pyramidal Implementation of the Lucas Kanade Feature Tracker Description of the algorithm Jean-Yves Bouguet Http://robots.stanford.edu/cs223b04/algo_tracking.pdf.

In template matching, a patch (hereinafter, the patch will be referred to as "reference region") is set at various positions on a reference image with respect to a patch having a target pixel at the center (hereinafter, the patch will be referred to as "target region"). Then, an energy function of the reference region of the target region is calculated, and a motion vector is derived based on a relative position of the reference region in which the energy function is minimized. An optical flow is derived by deriving the motion vector while scanning the target pixel. In commonly-used template matching, SSD or the sum of absolute difference (SAD) is used for an energy. As a more advanced method, a value obtained by weight-adding a smoothing term can be used as an energy function as in the gradient method.

SUMMARY

However, in the method that uses the smoothing term obtained by simply averaging the motions as in a Lucas Kanade method (hereinafter, referred to as "LK Method"), a coefficient of the smoothing term is determined through a trial-and-error process with respect to the image. Thus, it has been difficult to obtain best results in different conditions.

According to an aspect of the embodiments, an image processing apparatus that derives an optical flow which is a set of motion vectors of at least a part of pixels between a plurality of input images includes an acquisition unit and a deriving unit. The acquisition unit is configured to acquire a contrast value of one of the plurality of input images. The deriving unit is configured to derive the optical flow based on the contrast value acquired by the acquisition unit and an energy function. The energy function includes a data term specifying a correlation between the plurality of input images and a smoothing term specifying a degree of smoothing.

Further features of the disclosure will become apparent from the following description of exemplary embodiments with reference to the attached drawings.

BRIEF DESCRIPTION OF THE DRAWINGS

FIG. 2 is a conceptual diagram illustrating an optical flow.

FIG. 4 is a flowchart illustrating an optical flow calculation method according to a first exemplary embodiment.

DESCRIPTION OF THE EMBODIMENTS

A first exemplary embodiment will be described below. In the present exemplary embodiment, a method of deriving an optical flow using pyramid image processing will be described.

Figure 1:
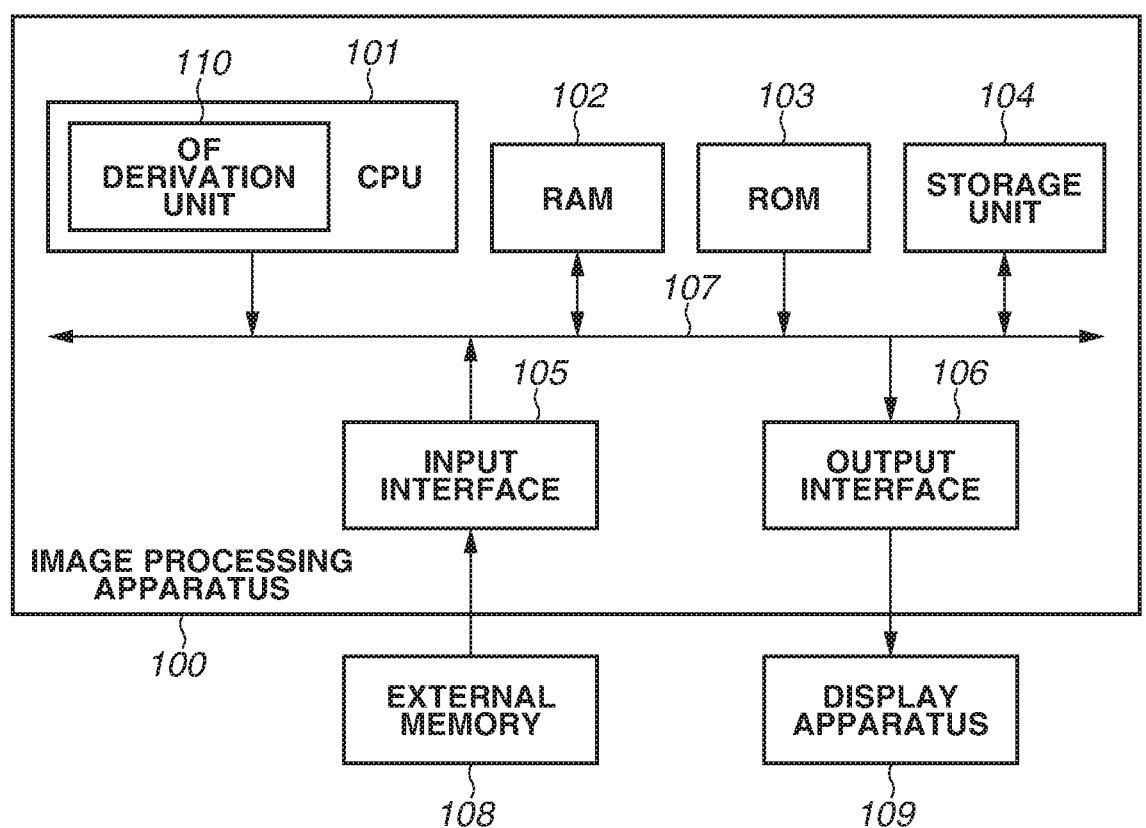
FIG. 1 is a block diagram illustrating a configuration of an image processing apparatus.

A configuration according to the present exemplary embodiment will be described. FIG. 1 illustrates a configuration of an image processing apparatus 100 according to the present exemplary embodiment.

The image processing apparatus 100 includes a central processing unit (CPU) 101, a random access memory (RAM) 102, a read-only memory (ROM) 103, a storage unit 104, an input interface 105, an output interface 106, and a system bus 107. An external memory 108 is connected to the input interface 105. A display apparatus 109 is connected to the output interface 106. Further, a portion in the CPU 101 cooperates with another module to function as an optical flow derivation unit 110. In the present exemplary embodiment, an optical flow will be referred to as "OF".

The CPU 101 is a processor configured to comprehensively control each component of the image processing apparatus 100. The OF derivation unit 110 cooperates with another module (e.g., RAM 102) to derive an optical flow described below as a function of the CPU 101. The RAM 102 is a memory configured to function as a main memory of the CPU 101 and a work area. Further, the ROM 103 is a memory configured to store programs for use in processing executed in the image processing apparatus 100. The CPU 101 (OF derivation unit 110) executes a program or a set of instructions stored in the ROM 103 using the RAM 102 as a work area to thereby execute various processing tasks or operations described below. The storage unit 104 is a storage device configured to store image data for use in processing executed in the image processing apparatus 100 and parameters for the processing. Examples of a storage device that can be used as the storage unit 104 include a hard disk drive (HDD), an optical disk drive, and a flash memory.

The input interface 105 is a serial bus interface such as a universal serial bus (USB) interface, an Institute of Electrical and Electronics Engineers (IEEE) 1394 serial bus interface, or a Serial Advanced Technology Attachment (SATA) serial bus interface. The image processing apparatus 100 can acquire processing-target image data from the external memory 108 (e.g., hard disk, memory card, compact flash (CF) card, secure digital (SD) card, USB memory) via the input interface 105. The external memory 108 can be an image capturing apparatus such as a camera. The output interface 106 is a video output terminal such as a Digital Video Interface (DVI) video output terminal or High-Definition Multimedia Interface (HDMI (registered trademark)) video output terminal. The image processing apparatus 100 can output image data processed by the image processing apparatus 100 to the display apparatus 109 (image display device such as a liquid crystal display) via the output interface 106. The input interface 105 and the output interface 106 can exchange information with the external apparatus via wired or wireless communication. Although the image processing apparatus 100 further includes other components besides the above-described components, the other components are not essential to the disclosure, and description thereof is omitted.

Terms and notions used herein will be described below. An "OF" refers to a map of motion vectors respectively corresponding to pixels of an image. Specifically, the OF is data that has the same resolution as the resolution of an input image and in which an element corresponding to a pixel is expressed as a floating-point two-dimensional vector. The same resolution of the optical flow as the resolution of the input image is not essential, and a set of motion vectors of at least some of the pixels can be employed.

A pixel value of an image is acquired as $I(x, y)$, where I is image data and $(x, y)$ are coordinates representing a pixel position. A pixel will be described as floating-point monochrome data in which black is zero and white is one, but the pixel is not limited to the floating-point monochrome data and can be, for example, 8-bit integer data. Similarly, a vector $(u(x, y), v(x, y))$ with respect to the coordinates $(x, y)$ is acquired for the optical flow. In a case in which a real number is delivered as a coordinate value in the above-described notation, a pixel value calculated by interpolation or a vector is acquired. Examples of an interpolation method include, but are not limited to, bilinear interpolation and bicubic interpolation. FIG. 2 illustrates a conceptual diagram of the optical flow. FIG. 2 illustrates a case in which images of a scene of a walking person 203 are captured by a moving camera, and images 201 and 202 contain the person 203 and a house 204 as objects. In order to simplify the description, although the motion vectors of respective parts of the body of the person 203 are different, it is assumed that the person 203 is uniformly moving in the direction of a vector 205 and the house 204 in the direction of a vector 206. In this case, the motion vector of the person 203 is $(10, 5)$, and the motion vector of the house 204 is $(-5, 0)$. The motion vector of a background is $(0, 0)$. In this case, an optical flow based on the image 201 as a reference is $(u(x, y), v(x, y))=(10, 5)$ in a case in which the pixel coordinates $(x, y)$ are contained in the person 203. Further, the optical flow is $(u(x, y), v(x, y))=(-5, 0)$ in a case in which the pixel coordinates $(x, y)$ are contained in the house 204, or the optical flow is $(u(x, y), v(x, y))=(0, 0)$ in a case in which the pixel coordinates $(x, y)$ are contained in the background. In the present exemplary embodiment, a case in which images 1 and 2 captured by a single camera at different time points are input and an optical flow is calculated will be described. Alternatively, images captured by different cameras at the same time point or at different time points can be input. In the case of the images captured by different cameras at the same time point, the depth of an object is also calculable from the optical flow.

In the present exemplary embodiment, pyramid image processing in which an image resolution is gradually increased is used, and each layer is specified by a variable with "[ ]" added thereto. For example, I[1] specifies an image in a first layer of pyramid image. Unless otherwise specified, the steps of a process illustrated in a flowchart are executed in an order specified by an arrow in the drawings. Further, the order of steps can be changed if the steps do not have a dependence relationship. While the process in each step will be described as a process in image units in which the process is executed in frame units and a target pixel is scanned in each step to thereby execute processing on every pixel, the process is not limited to the process in image units. The process can be executed in pixel units or units of a plurality of pixels.

A process executed by the image processing apparatus 100 according to the present exemplary embodiment will be described with reference to a flowchart illustrated in FIG. 4. In the present exemplary embodiment, the CPU 101 (or OF derivation unit 110) executes a program or a set of instructions to perform operations described in the flowchart in FIG. 4. The program or the set of instructions may be stored in the ROM 103. Further, unless otherwise specified, input/output data is input from the RAM 102 and output to the RAM 102.

In step S4010, target image data and reference image data are acquired. While the case of acquiring two image data is described in the present exemplary embodiment, a plurality of images or moving image data can be acquired. In a case where three or more images or a moving image is acquired, two target images or a frame is selected and the process illustrated in the flowchart in FIG. 4 is continuously executed.

In step S4020, the maximum number of layers (max_lv) is acquired, and reduced images of lv=0 to max_lv are generated. The value of max_lv is preset, and in the present exemplary embodiment, a case in which max_lv is set to 5 will be described. Further, lv is an index that specifies a layer, and lv of a non-scaled image is 0 and lv of a minimum image layer is 5. In other words, the number of layers is six. In the present exemplary embodiment, maxl_lv is set in such a manner that the width of the minimum image is 5% or less of the width of the non-scaled image. A method of calculating max_lv will be described with reference to equation (1).

$$\log_{scale\_factor} 0.05 = \log_{0.5} 0.05 \approx 4.3 \quad (1)$$

A value obtained by rounding up the result of equation (1) is max_lv, which is 5. If the width of the minimum image is set to 10% or less of the width of the non-scaled image, max_lv can be 4. The width of the minimum image should be set to a smaller value as the motion of a motion detection target between images is larger, but it is desirable to set the width to an optimum width based on various factors such as processing time. In the present exemplary embodiment, a case in which a scale_factor (hereinafter, "sf"), which specifies the reduction ratio between the image layers of an image, is 0.5 will be described. A reduction rate s of the layer=lv is calculated using equation (2).

$$s = sf^{lv} \quad (2)$$

Images $I_1[lv]$ and $I_2[lv]$ are images respectively acquired by reducing the target image and the reference image to the reduction rate s given by equation (2). The value of sf is not limited to 0.5 and can be a value such as 0.7 or 0.9. In the present exemplary embodiment, a bicubic method is used in the reduction process. The reduction method is not limited to the bicubic method and, for example, a Lanczos 3-lobed method can be used. In the case of lv=0, the reduction rate is s=1, so that no reduction is needed. The target image data and the reference image data acquired in step S4010 are respectively expressed as $I_1[0]$ and $I_2[0]$.

In step S4030, lv is set to the maximum layer max_lv.

In step S4040, a contrast value of lv layer data on the target image is calculated. In the present exemplary embodiment, a standard deviation S is calculated from an image histogram and determined as the contrast value. The contrast value is not limited to the standard deviation, and a quartile deviation of the image histogram can be used. Further, the contrast value is not the contrast value of the target image but can be a contrast value of the reference image or an average of the contrast values of the target image and the reference image.

In step S4050, whether lv=max_lv is determined. If the determination result indicates true, i.e., lv=max_lv, (YES in step S4050), the processing proceeds to step S4055. On the other hand, if the determination result indicates false, i.e., lv≠max_lv, (NO in step S4050), the processing proceeds to step S4060.

In step S4055, an OF initialization unit generates an optical flow (smoothed optical flow) in which the motion vector of every pixel is set to 0, and the processing proceeds to step S4090.

In step S4060, the optical flow of the lv+1 layer is enlarged to generate an enlarged optical flow. Specifically, the optical flow calculated at the lv+1 layer is enlarged by 1/sf and the vector elements are also enlarged by 1/sf to thereby generate (u'(x, y), v'(x, y)). In the enlargement, X- and Y-components of a motion vector are independently processed as in the enlargement of a red-green-blue (RGB) image in which R, G, and B components are independently processed. While the enlargement is executed using bilinear interpolation in the present exemplary embodiment, any other interpolation method such as the bicubic method can be used. In the present exemplary embodiment, sf is 0.5, so that the optical flow is enlarged by 1/0.5, i.e., 2. The calculation is executed using equation (3) below.

$$(u'(x, y), v'(x, y)) = \frac{1}{sf}(u(sf \times x, sf \times y), v(sf \times x, sf \times y)) \quad (3)$$

The above-described processing is executed for every pixel to thereby acquire an enlarged optical flow for one image. Hereinafter, a case in which $I_1=[lv]$ and $I_2=I_2[lv]$ will be described.

In step S4070, each pixel of the image $I_2$ is moved according to the optical flow to thereby generate a warping image $I_{2w}$. The warping image is calculable using equation (4) below.

$$I_{2w}(x,y) = I_2(x + u'(x,y), y + v'(x,y)) \quad (4)$$

The above-described processing is executed for every pixel.

In step S4080, a smoothed optical flow is generated based on the standard deviation, the lv layer data of the target image, and the enlarged optical flow. In the case in which lv=0, no warping image is generated, so that the processing is executed using the reference image as the warping image. Further, since no smoothed optical flow is generated either, the processing is executed using the optical flow generated in step S4080 as the smoothed optical flow. Details of the processing will be described below.

In step S4100, whether lv=0 is determined. If lv=0 (YES in step S4100), the process illustrated in the flowchart is ended. On the other hand, if lv≠0 (NO in step S4100), the processing proceeds to step S4120.

In step S4120, lv is set to lv=lv−1.

An optical flow for one layer is generated through steps S4040 to S4120. In the case in which lv≠0, the optical flow is input to the next pyramid image processing, whereas in the case in which lv=0, the optical flow is output as a final optical flow.

A method of calculating a smoothing vector in step S4080 will be described. The smoothing vector is calculable using equations (5) and (6) below.

$$\text{luma\_th} = k_S \times S \quad (5)$$

$$X = \left\{ \begin{pmatrix} u(x+x_i, y+y_i) \\ v(x+x_i, y+y_i) \end{pmatrix} \middle| \text{abs}(I_1(x+x_i, y+y_i) - IL1(x, y)) < \text{luma\_th}, (x_i, y_i) \in \Omega \right\} \quad (6)$$

Figure 5:
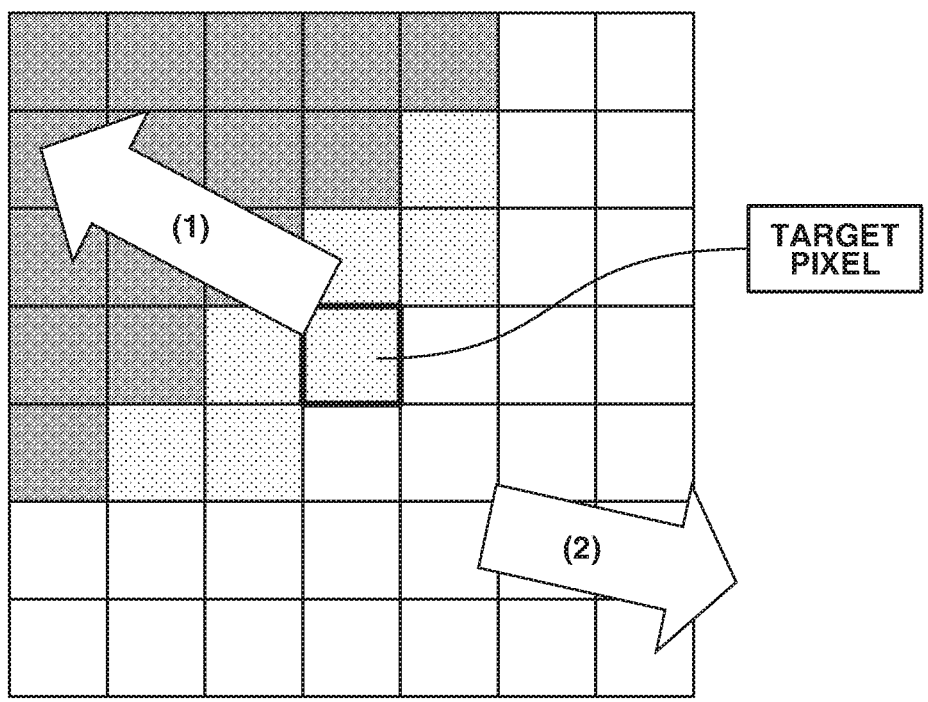
FIG. 5 illustrates an enlarged example of a target pixel and pixels neighboring the target pixel.

In equations (5) and (6), luma_th is a threshold value for differentiating a difference in luminance of an object, S is a value corresponding to the contrast value calculated in step S4040, and $k_s$ is a coefficient for converting S into the threshold value and is set to 0.5 in the present exemplary embodiment. While luma_th is set based on the contrast value in the present exemplary embodiment, luma_th can be a fixed value. In this case, it is appropriate to set the value of luma_th in the range of 0.05 to 0.3. Further, $\Omega$ is a 7×7 neighborhood region having the target pixel (x, y) at the center of the region. Further, $(x_i, y_i)$ are relative coordinates of a pixel contained in the 7×7 region. While the 7×7 region is described in the present exemplary embodiment, the region is not limited to the 7×7 region. Further, $X_{ex} = \{A_{ex} | B_{ex}\}$ is a notation indicating that an element satisfying the condition $B_{ex}$ is extracted from the set $A_{ex}$ to thereby generate the set $X_{ex}$. Further, X is a set of motion vectors, i.e., a set of two-dimensional vectors. Specifically, equation (6) indicates that a neighborhood pixel having a pixel value close to the pixel value of the target pixel is extracted and a motion corresponding to the extracted neighborhood pixel is extracted. This extraction will be described with reference to FIG. 5. FIG. 5 illustrates an example of an enlarged view of the target pixel and pixels neighboring the target pixel. The pixel at the center is the target pixel. Each shade represents a pixel value. The pixels in the shaded portion move in a direction (1) as indicated by an arrow in FIG. 5, i.e., are in motion (1). The pixels in the non-shaded portion move in a direction (2) as indicated by an arrow in FIG. 5, i.e., are in motion (2). Further, if the shaded pixels are pixels close to the target pixel and motion vectors corresponding to the shaded pixels are extracted, the number of shaded pixels is 22. Thus, a set of 22 motion vectors is acquired as the set X. The following calculation is executed using the extracted motion vectors.

$$\begin{pmatrix} u_{smooth} \\ v_{smooth} \end{pmatrix} = \begin{pmatrix} \text{median}(X_u) \\ \text{median}(X_v) \end{pmatrix} \quad (7)$$

In equation (7), $X_u$ and $X_v$ are respectively a set of vertical components of the set X of two-dimensional vectors and a set of horizontal components of the set X. A median(Z) is a function that returns a median value of a set Z of numerical values. Equation (7) indicates that the median values of the horizontal and vertical components of the set X are calculated as smoothing vectors. A supplemental description will be given below to explain the reason why a median value is taken. When a set of motion vectors are acquired, all the motion vectors do not always have the same decimal pixel accuracy. Some of the sets may include an outlier. Thus, the median values are calculated to eliminate the outlier and a representative value with respect to the set X is calculated. In the case where the median values are calculated using the motion vectors corresponding to the 7×7=49 neighborhood pixels, the dominant components of the region are in motion (2), so that the motion (2) is erroneously selected. Thus, it is important to generate the set X using equation (6).

Figure 6:
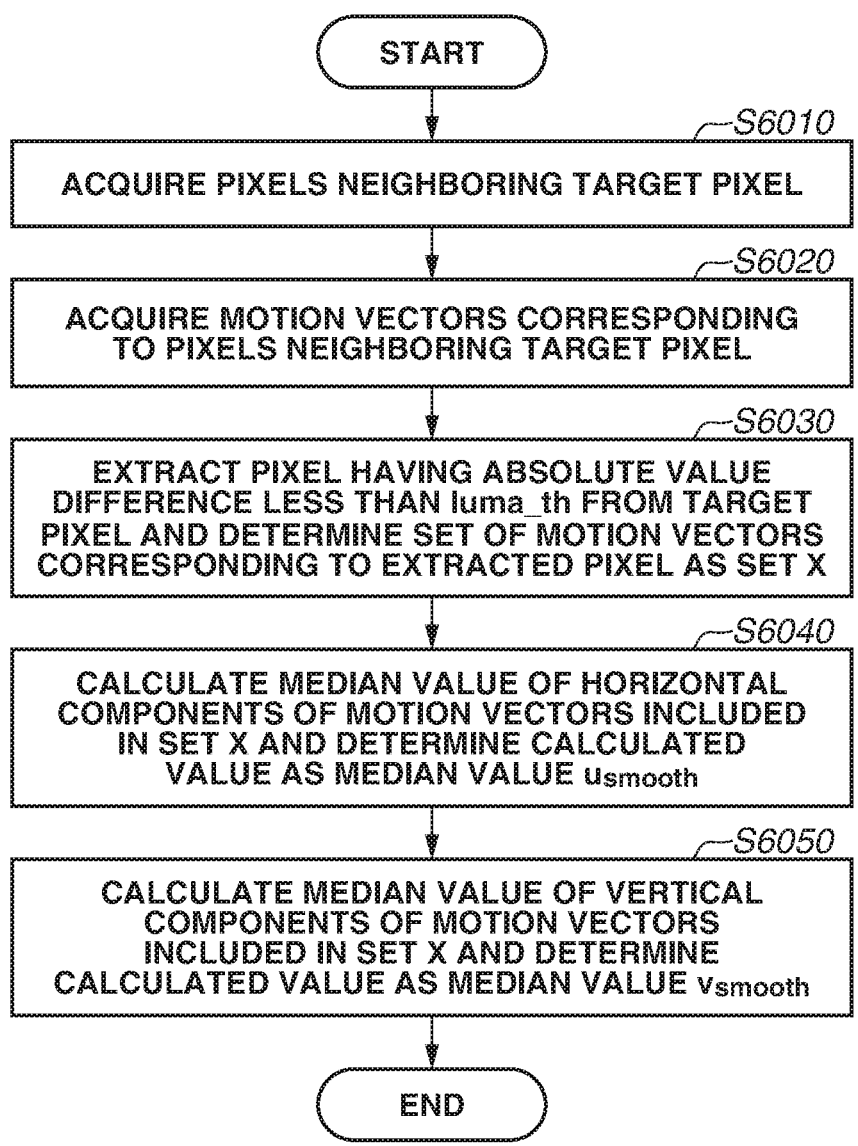
FIG. 6 is a flowchart illustrating a smoothing vector calculation method according to the first exemplary embodiment.

The smoothing vector calculation method expressed by equations (6) and (7) will be described with reference to FIG. 6. FIG. 6 is a flowchart illustrating the smoothing vector calculation method according to the first exemplary embodiment.

In step S6010, a group of pixels neighboring the target pixel is acquired. In the present exemplary embodiment, the pixels of the 7×7 region having the target pixel at the center of the region are acquired.

In step S6020, a plurality of motion vectors corresponding to the pixels neighboring the target pixel is acquired.

In step S6030, a pixel having an absolute value difference less than luma_th from the target pixel is extracted, and a set of motion vectors corresponding to the extracted pixel is determined as a set X.

In step S6040, the median value of the horizontal components of the motion vectors included in the set X is calculated and determined as $u_{smooth}$. In the median value calculation, the numerical values included in the set, i.e., the horizontal components of the motion vectors included in the set X, are extracted and sorted, and the median value of the horizontal components is returned. The sorting method is quick sorting is used as the sorting method in the present exemplary embodiment, but the sorting method is not limited to the quick sorting, and a similar effect can be produced even if a different method, such as bubble sorting, is used.

In step S6050, the median value of the vertical components of the motion vectors included in the set X is calculated and determined as $v_{smooth}$. Details are similar to step S6040.

The above-described process is executed for every pixel to acquire a smoothed optical flow which is a set of smoothing motion vectors of the entire screen.

In the present exemplary embodiment, the neighborhood pixels having a pixel value close to the pixel value of the target pixel are extracted and used as a population for generating the smoothing term indicating the smoothing level of the motion vectors corresponding to the extracted pixels. The neighborhood pixels that are similar in luminance are likely to be included in the same object. Thus, the smoothing is executed using a motion of the pixels included in the same object, so that averaged motion vectors, which do not exist fundamentally, are not produced at a boundary portion, and thus the motion of the pixels is detected with great accuracy.

A process relating to the processing executed in step S4090 will be described. The processing executed in step S4090 is to estimate the motion vector ($u_{out}(x, y)$, $v_{out}(x, y)$) that minimizes the energy function with respect to the target pixel (x, y) using a gradient method. The energy function will be described. A fundamental of the energy function is a term that is referred to as a data term and specifies a correlation between a plurality of images, and the data term is defined by equations (8) and (9) below.

$$\rho(x, y) = f(I_1(x, y) - I_{2w}(x, y)) \quad (8)$$

$$E(x, y) = \sum_{(\omega, \eta) \in B} \rho(x + \omega, y + \eta) \quad (9)$$

In equation (8), $I_{2w}$ is an image obtained by warping $I_2$ according to equation (4), and f is a function that expresses a difference between $I_1$ and $I_{2w}$ as energy, and an absolute value or a squared difference can be used. Further, B is a patch region having the target pixel (x, y) at the center of the patch region. For example, in the case of the 7×7 patch region, equation (9) expresses an integration process with respect to $\rho(x+\omega,y+\eta)$, where $\omega$ and $\eta$ are integers in the range of −3 to 3. However, equation (9) does not always express an optimum energy function. For example, the image may contain a distortion or no texture may not exist. In order to solve such an issue, the smoothing term for smoothing the optical flow is added as a constraint condition. The energy function E(x, y) is determined based on the contrast value of the input image, the data term, and the smoothing term. An equation with the smoothing term added is as follows.

$$E(x, y) = \sum_{(\omega,y\eta) \in B} \rho(x + \omega, y + \eta) + \theta \cdot \phi(u'(x, y) + du - u_{smooth}(x, y), v'(x, y) + dv - v_{smooth}(x, y)) \quad (10)$$

In equation (10), $\phi$ is a function that expresses a difference between (u'(x, y), v' (x, y)) and ($u_{smooth}$(x, $v_{smooth}$(x, y)), and an absolute value or a squared difference can be used. Further, (u'(x, y), v'(x, y)) is the enlarged optical flow generated in step S4060, and $u_{smooth}$(x, y) and $v_{smooth}$(x, y) are the smoothing vectors and are elements of the optical flow calculated in step S4080. Further, (du, dv) is a difference between a motion vector ($u_{out}$(x, y), $v_{out}$(x, y)), which is originally to be obtained, and (u'(x, y), v'(x, y)). In equation (10), θ is a coefficient that determines the contribution of the smoothing term $\phi$. A method for calculating θ will be described below. In equation (10), the energy function includes a weighted average of the data term and the smoothing term. In the present exemplary embodiment, ρ and $\phi$ are defined as follows.

$$\rho(x,y)=[I_2(x+u'(x,v)+du,y+v'(x,y)+dv)-I_1(x,y)]^2 \quad (11)$$

$$\varphi(x,y)=[u'(x,y)+du-u_{smooth}(x,y)]^2+[v'(x,y)+dv-v_{smooth}(x,y)]^2 \quad (12)$$

To calculate ($u_{out}$(x, y), $v_{out}$(x, y)), (du, dv) needs to be calculated, so that an equation for deriving (du, dv) is defined. At this time, du and dv are assumed to be sufficiently small, and a Taylor series of ρ is calculated as follows $$\rho(x,y) \sim [I_{2xw}(x,y)du+I_{2yw}(x,y)dv+I_{2w}(x,v)-I_1(x,y)]^2 \quad (13)$$

Further, $I_{2xw}$ and $I_{2yw}$ are primary partial differential values of $I_{2w}$ and are calculated using equation (14) below.

$$I_{2wx}(x,y)=(I_{2w}(x+1,y)-I_{2w}(x-1,y))/2$$

$$I_{2wy}(x,y)=(I_{2w}(x,y+1)-I_{2w}(x,y-1))/2 \quad (14)$$

Alternatively, the primary partial differential values can be calculated by applying a horizontal/vertical Sobel filter. In the case in which a Sobel filter is applied, noise robustness is improved. Further, a primary partial differential value of $I_2$ is calculated using equation (15) below.

$$I_{2x}(x,y)=(I_2(x+1,y)-I_2(x-1,y))/2$$

$$I_{2y}(x,y)=(I_2(x,y+1)-I_2(x,y-1))/2 \quad (15)$$

Alternatively, $I_{2xw}$ and $I_{2yw}$ can be calculated by warping $I_{2x}$ and $I_{2y}$ as described above with reference to equation (4). Since equation (13) is a quadric function of du and dv, an analytical solution that minimizes equation (10) is calculable. The analytical solutions du and dv satisfy the following simultaneous equation.

$$A\begin{pmatrix} du \\ dv \end{pmatrix} = \begin{pmatrix} u_t \\ v_t \end{pmatrix} \quad (16)$$

The following equations are defined.

$$A = \begin{pmatrix} \theta + \sum_{(\omega,y\eta) \in B} I_{2xw}(x+\omega, y+\eta)^2 & \sum_{(\omega,y\eta) \in B} I_{2xw}(x+\omega, y+\eta)I_{2yw}(x+\omega, y+\eta) \\ \sum_{x+\omega,y+\eta \in B} I_{2xw}(x+\omega, y+\eta)I_{2yw}(x+\omega, y+\eta) & \theta + \sum_{(\omega,y\eta) \in B} I_{2xw}(x+\omega, y+\eta)^2 \end{pmatrix} = \begin{pmatrix} \theta + a & c \\ c & \theta + d \end{pmatrix} \quad (17)$$

$$\begin{pmatrix} u_t \\ v_t \end{pmatrix} = \begin{pmatrix} -\sum_{(\omega,y\eta) \in B} I_{2xw}(x+\omega, y+\eta)I_t(x+\omega, y+\eta) - \theta(u_{in}(x, y) - u_{smooth}(x, y)) \\ -\sum_{(\omega,y\eta) \in B} I_{2yw}(x+\omega, y+\eta)I_t(x+\omega, y+\eta) - \theta(v(x, y) - v_{smooth}(x, y)) \end{pmatrix} \quad (18)$$

$$I_t(x, y) \equiv I_{2w}(x, y) - I_1(x, y) \quad (19)$$

Further, θ is calculated using equation (20) below.

$$\theta = k \times S^{Nr} \quad (20)$$

In equation (20), S is a value corresponding to the contrast value and, in the present exemplary embodiment, the standard deviation of the luminance of the entire screen as described above. Further, N is the order of the energy function. In the present exemplary embodiment, since the order of each term is 2 as specified in equations (11) and (12), N equals 2, i.e., N=2. Further, k and r are adjustment terms representing the sensitivity that determines the magnitude of a coefficient change according to the contrast value, and r is a value of 0.5 to 4 and k is a value of 0.1 to 0.000001. In the present exemplary embodiment, r=1.5, and k=0.01. As described above, the coefficient according to the present exemplary embodiment is calculated at least by raising C to the power of Nr, where N is the order of the energy function, C is the contrast value, and r is a value specifying the sensitivity. The present exemplary embodiment has been described using the example that B is the 7×7 patch. If the patch size is changed, k needs to be increased or decreased according to the increase or decrease of the patch size.

By multiplying each side of equation (15) by an inverse matrix of A, du and dv are obtained. Specifically, the final motion is calculable using equations (21) and (22) below.

$$\begin{pmatrix} du \\ dv \end{pmatrix} = A^{-1} \begin{pmatrix} u_t \\ v_t \end{pmatrix} \quad (21)$$

$$\begin{pmatrix} u_{out}(x,y) \\ v_{out}(x,y) \end{pmatrix} = \begin{pmatrix} u'(x,y) \\ v'(x,y) \end{pmatrix} + \begin{pmatrix} du \\ dv \end{pmatrix} \quad (22)$$

The above-described process is executed for every pixel, thereby obtaining an optical flow of the lv layer.

Figure 7:
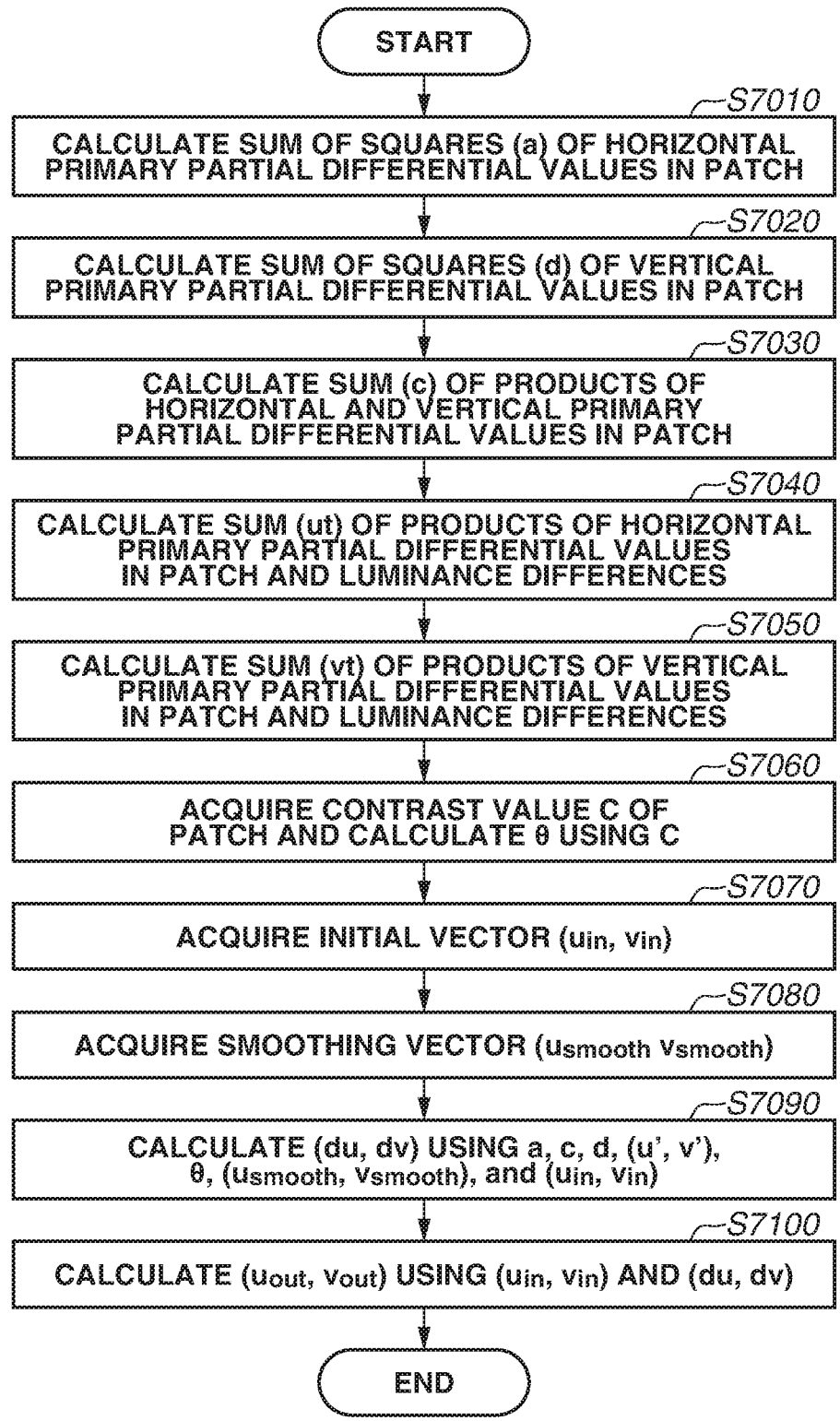
FIG. 7 is a flowchart illustrating a motion vector calculation method in a gradient method.

A process of executing calculations of the above-described equations will be described with reference to FIG. 7. FIG. 7 is a flowchart illustrating a motion vector calculation method in the gradient method. The case in which the patch is the 7×7 region having the target pixel at the center of the region will be described. Variables a, c, d, (u', v'), θ, ($u_{smooth}$(x, $v_{smooth}$(x, y)), (u'(x, y), v'(x, y)), and (du, dv) used in the description below correspond to the variables used in equations (19) to (24). The symbols that specify coordinates, such as (x, y), are omitted.

In step S7010, the sum of squares (a) of horizontal primary partial differential values in the patch of the warping image is calculated.

The primary partial differential values are obtained by the method specified by equation (14). In the present exemplary embodiment, since the patch is 7×7, the sum of 49 differential values is calculated.

In step S7020, the sum of squares (d) of vertical primary partial differential values in the patch of the warping image is calculated.

In step S7030, the sum (c) of the products of the horizontal and vertical primary partial differential values in the patch of the warping image is calculated.

In step S7040, the sum ($u_t$) of the products of the horizontal primary partial differential values in the patch of the warping image and the luminance differences is calculated. The calculation is as expressed by the first row of equation (22).

In step S7050, the sum ($v_t$) of the products of the vertical primary partial differential values in the patch of the warping image and the luminance differences is calculated. The calculation is as expressed by the second row of equation (22).

In step S7060, a contrast value C of the patch is acquired, and θ is calculated based on the contrast value C.

In step S7070, an initial vector (u'(x, y), v' (x, y)) is acquired. The initial vector is a motion vector corresponding to the coordinates (x, y) of the optical flow acquired by enlarging the optical flow acquired at the reduction layer.

In step S7080, a smoothing vector ($u_{smooth}$(x, $v_{smooth}$(x, y)) is acquired. The smoothing vector is acquired by the process described above with reference to FIG. 6.

In step S7090, (du, dv) is calculated using a, c, d, (u', v'), θ, ($u_{smooth}$(x, y), $v_{smooth}$(x, y)), and (u'(x, y), v'(x, y)). The calculation corresponds to equations (19) to (24).

In step S7100, ($u_{out}$(x, y), $v_{out}$(x, y)) is calculated using (u'(x, y), v'(x, y)) and (du, dv). The calculation corresponds to equation (22).

The above-described control enables calculation of the optimum contribution (coefficient) of the smoothing term for each image. In the conventional cases of using the smoothing term based on the average of simple motions, there is a problem that an optical flow is not correctly derived especially in a dark scene (scene with insufficient exposure). A feature of the present exemplary embodiment that the coefficient is determined based on the contrast makes it possible to derive an appropriate coefficient even in, for example, a dark scene (scene with low contrast). In other words, an optical flow with better quality can be acquired with respect to each one of images of different imaging conditions.

While the method of analytically calculating ($u_{out}$(x, y), $v_{out}$(x, y)) by solving an equation is described, the method is not limited to the above-described method. Even in the case of using a successive over-relaxation (SOR) method, ($u_{out}$(x, y), $v_{out}$(x, y)) is calculable by performing an energy calculation using the smoothing term using the smoothing vector described above with reference to FIG. 6. While the basic computations are executed by the CPU 101 in the present exemplary embodiment, the configuration is not limited to the above-described configuration, and the computations can be executed by dedicated hardware configured to perform processing in each step.

A second exemplary embodiment will be described. In the first exemplary embodiment, the example is described in which θ, i.e., the contribution of the smoothing term, is calculated from the contrast of the entire screen in order to detect the optical flow. In the present exemplary embodiment, an example in which θ is calculated for each target pixel will be described.

Figure 8:
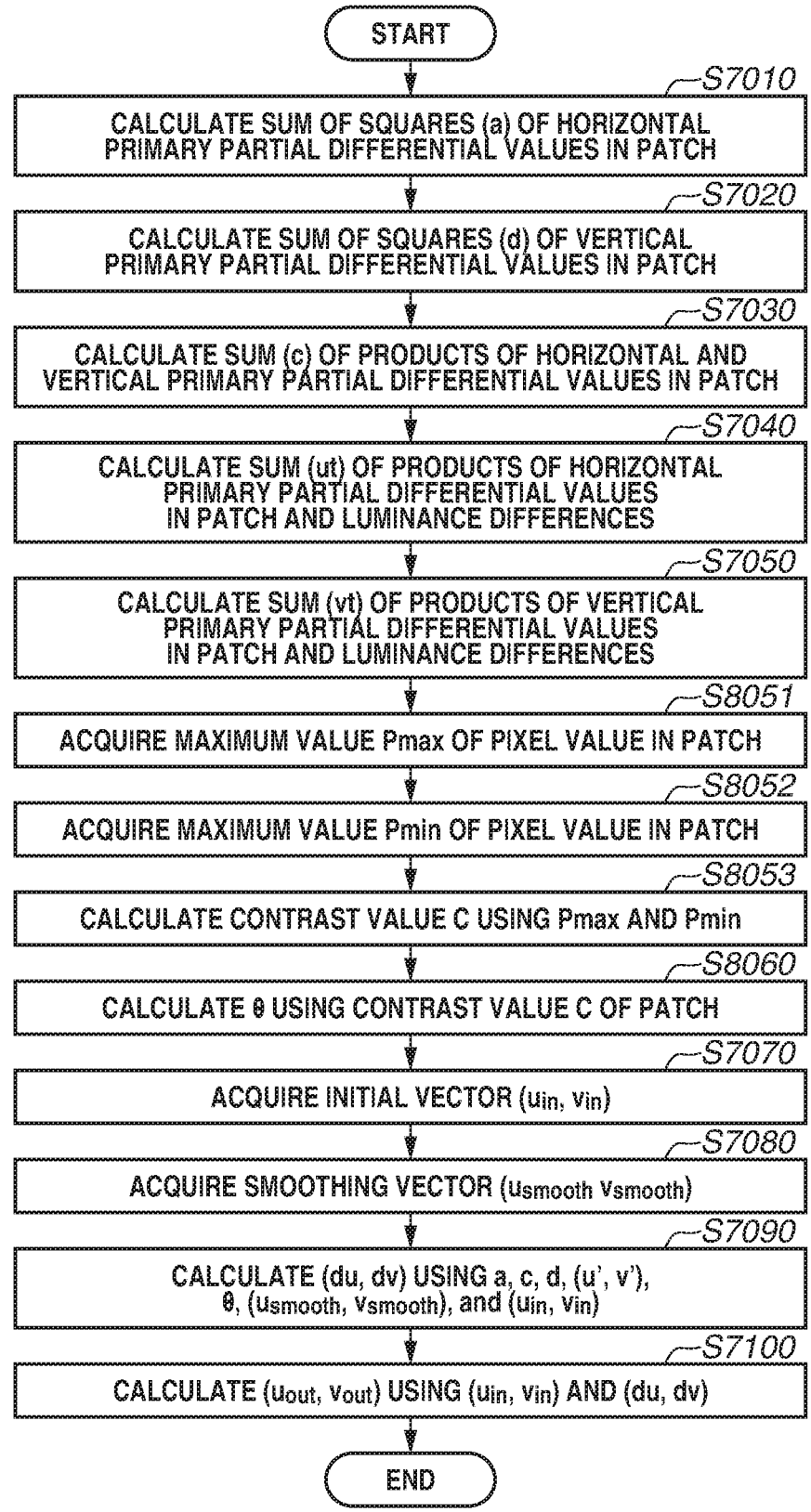
FIG. 8 is a flowchart illustrating a smoothing vector calculation method according to a second exemplary embodiment.

In the present exemplary embodiment, the process of calculating the motion vector of the target pixel that is described above in the first exemplary embodiment with reference to FIG. 7 is replaced with the process illustrated in FIG. 8. FIG. 8 is a flowchart illustrating a smoothing vector calculation method according to the second exemplary embodiment. In FIG. 8, steps S8051 to S8053 are added to the process described above in the first exemplary embodiment with reference to FIG. 7, and step S7060 is replaced with step S8060. The processes in steps given the same reference numerals as those in FIG. 7 are similar to the processes in steps in the first exemplary embodiment.

In step S8051, a maximum value $P_{max}$ of the pixel values in the patch is acquired.

In step S8052, a minimum value $P_{min}$ of the pixel values in the patch is acquired.

In step S8053, the contrast value C of the patch is calculated. The contrast value C in the present exemplary embodiment is calculated using equation (23) below, where $P_{max}$ is the maximum value of the pixel values in the patch, and $P_{min}$ is the minimum value of the pixel values in the patch.

$$C = P_{max} - P_{min} \quad (23)$$

As described above in the first exemplary embodiment, the patch size is 7×7, so that the maximum and minimum values of the 49 elements are acquired. While the contrast value C is acquired by calculating the difference between the maximum and minimum values in the present exemplary embodiment, the calculation is not limited to the above-described method, and the contrast value C can be calculated using quartiles by calculating the difference between the first and third quartiles.

In step S8060, θ is calculated using the contrast value C of the patch. The calculation is performed using equations (24) to (26) below.

$$\theta = k \times \text{clip}(C, T_{min}, T_{max})^{Nr} \quad (24)$$

$$T_{min} = K_{min} \times S \quad (25)$$

$$T_{max} = K_{max} \times S \quad (26)$$

In equation (24), clip(v, min, max) is a function that saturates the value of "a" with the maximum value if the value of "a" is more than or equal to the maximum value, and saturates the value of "v" with the minimum value if the value of "v" is less than or equal to the minimum value. Further, S is the standard deviation of the luminance of the screen as described above, and $K_{min}$ is a coefficient that determines the minimum value. In the present exemplary embodiment, $K_{min}$ is set to 0.2, although not limited thereto. Further, $K_{max}$ is a coefficient that determines the maximum value. In the present exemplary embodiment, $K_{max}$ is set to 1.2, although not limited thereto. The clip process is to limit the possible range of θ in a case in which the value of C is extremely large due to the presence of image noise in the patch or is extremely small due to the flatness of the region of the patch. Thus, $K_{min}$ and $K_{max}$ are to be set based on an estimated amount of noise. Further, K, r, and N are similar to those in the first exemplary embodiment. While the upper and lower limits given to the clip function are used as the standard deviation of the screen luminance in the present exemplary embodiment, the values are not limited to the above-described values. For example, fixed values can be set, e.g., Tmax=0.3 and Tmin=0.1.

The above-described process is executed using the contrast of the patch having the target pixel at the center of the patch to thereby calculate a suitable value of θ for each region. Thus, even in a case in which, for example, a screen includes a sunny region and a shaded region which have different contrast values, an optimum value of θ is determined in the calculation of a motion in each region.

While the size of the patch for which the contrast value C is calculated is the same as the size of the patch to which the gradient method is applied in the present exemplary embodiment, the patch size is not limited to the above-described patch size. The patch only needs to have the same patch center as that of the patch to which the gradient method is applied, and a patch that is larger or smaller than the patch to which the gradient method is applied can be used. The size of the patch to which the gradient method is applied in the present exemplary embodiment is 7×7 which is relatively small, and a more optimum value of θ is calculable if the contrast value C is calculated using, for example, a patch size of 15×15. This, however, leads to an increased amount of computation, so that the patch size is set based on the balance between the amount of computation and performance.

A third exemplary embodiment will be described below. In the first exemplary embodiment, the optical flow calculation method using the gradient method is described. In the present exemplary embodiment, an optical flow calculation method using a motion search will be described.

Figure 9:
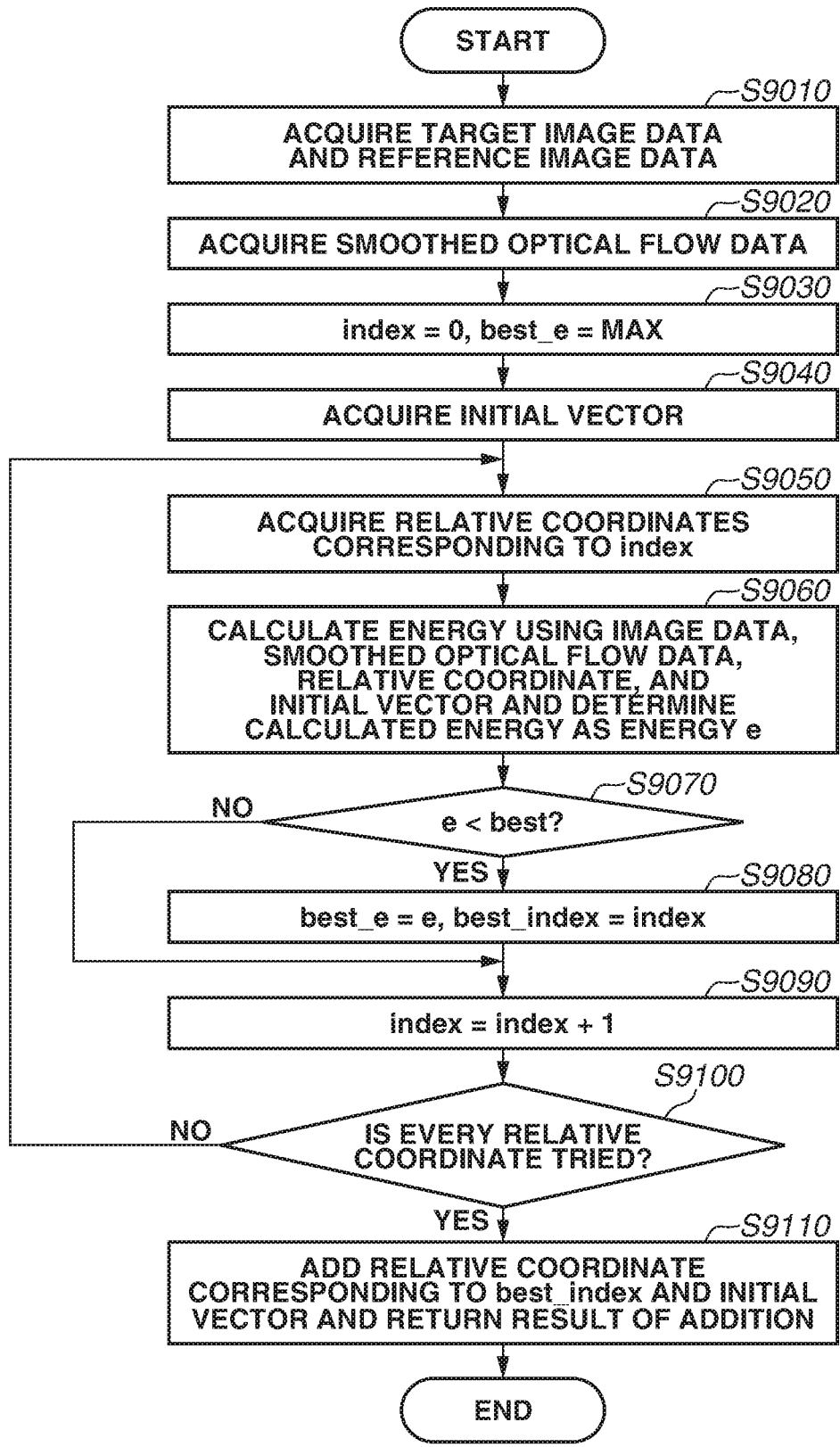
FIG. 9 is a flowchart illustrating a motion vector calculation method in a motion search.

The process of calculating the motion vector of the target pixel that is described above in the first exemplary embodiment with reference to FIG. 7 is replaced with a process illustrated in FIG. 9, i.e., equation (21) is replaced with equation (27), in the present exemplary embodiment. In the present exemplary embodiment, (du, dv) is calculated using equation (27) below instead of equation (21).

$$\binom{du}{dv} = \underset{(du,dv) \in W}{\arg\min} E(x + u'(x, y) + du, y + v'(x, y) + dv) \quad (27)$$

Further, ρ and φ of the energy function defined by equation (10) are defined as follows.

$$\rho(x,y) = |I_2(x+u'(x,y)+du, y+v'(x,y)+dv) - I_1(x,y)| \quad (28)$$

$$\varphi(x,y) = |u'(x,y)+du-u_{smooth}(x,y)| + |v'(x,y)+dv-v_{smooth}(x,y)| \quad (29)$$

W is a region that specifies a search range and is set to, for example, a 7×7 region having the target pixel at the center of the region. In the present exemplary embodiment, full-search processing is performed in which the calculation of equation (27) is performed 49 (=7×7) times while changing (du, dv) from −3 to 3 in integer units to search for (du, dv) at which the smallest result is obtained. The processing result is applied to equation (22), thereby acquiring a motion vector of the target pixel.

FIG. 9 will be described below. FIG. 9 is a flowchart illustrating a motion vector calculation method in the motion search.

At this time, θ is calculated from equation (20) using N=1 since the order of the term of the energy function is 1 as specified by equations (28) and (29) in the present exemplary embodiment.

In step S9010, target image data and reference image data are acquired.

In step S9020, smoothed optical flow data is acquired.

In step S9030, index=0, and best_e=MAX.

In step S9040, an initial vector is acquired. The initial vector corresponds to (u'(x, y), v' (x, y)) as in the process described above with reference to FIG. 7.

In step S9050, relative coordinates corresponding to the index are acquired. In the present exemplary embodiment, the relative coordinates are acquired by giving an index value starting with 0 to each combination of coordinates from −3 to 3 horizontally and vertically. The number of combinations of relative coordinates is 49.

In step S9060, an energy is calculated using the image data, the smoothed optical flow data, the relative coordinates, and the initial vector, and the calculated energy is determined as an energy "e".

In step S9070, whether e<best is determined. If the determination result indicates true, i.e., if it is determined that e<best (YES in step S9070), the processing proceeds to step S9080. On the other hand, if the determination result indicates false, i.e., if it is not determined that e<best (NO in step S9070), the processing proceeds to step S9090.

In step S9080, best_e=e, and best_index=index. In other words, best_e and best_index are updated in the case in which it is determined that the energy function is small in step S9070.

In step S9090, index=index+1.

In step S9100, whether every relative coordinate is tried is determined. In the present exemplary embodiment, whether the energy is calculated using the 49 combinations of relative coordinates is determined. If the determination result indicates true, i.e., if it is determined that every relative coordinate is tried (YES in step S9100), the processing proceeds to step S9110. On the other hand, if the determination result indicates false, i.e., if it is determined that not every relative coordinate is tried (NO in step S9100), the processing returns to step S9050.

In step S9110, the relative coordinates corresponding to best_index and the initial vector are added, and the result obtained by the addition is returned. Specifically, the relative coordinates corresponding to best_index are (dv, dv), and the initial vector is (u', v'), so that the calculation performed in step S9110 corresponds to equation (22).

The above-described process is executed for every pixel, thereby acquiring an optical flow of the target layer lv.

An advantage similar to that of the first exemplary embodiment is produced by performing the above-described processing and control.

That is, it is indicated that, while the gradient method is performed using the equation derived by transforming the energy function in the first exemplary embodiment, the same energy function is applied to template matching and the calculation of the contribution of the smoothing term is also applicable in the second exemplary embodiment. While the full-search processing in which E(x+u'(x, y)+du, y+v'(x, y)+dv) is calculated with respect to every integer coordinate in the search range is described in the present exemplary embodiment, search processing is not limited to the full-search processing, and search processing using a step search can be used.

A fourth exemplary embodiment will be described. While the CPU 101 executes the optical flow calculation processing in the first exemplary embodiment, an example in which the CPU 101 controls the OF derivation unit 110 to execute processing will be described in the fourth exemplary embodiment. Unless otherwise specified, basic calculations are similar to those described in the first exemplary embodiment.

Figure 3A:
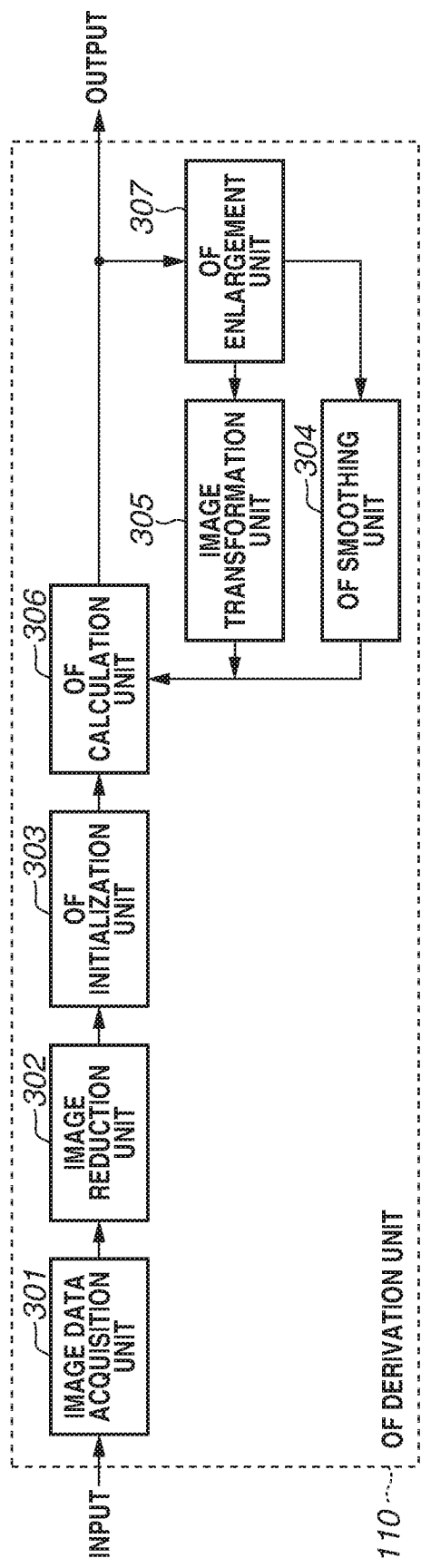
FIGS. 3A and 3B are block diagrams illustrating an internal configuration of an optical flow (OF) derivation unit.
Figure 3B:
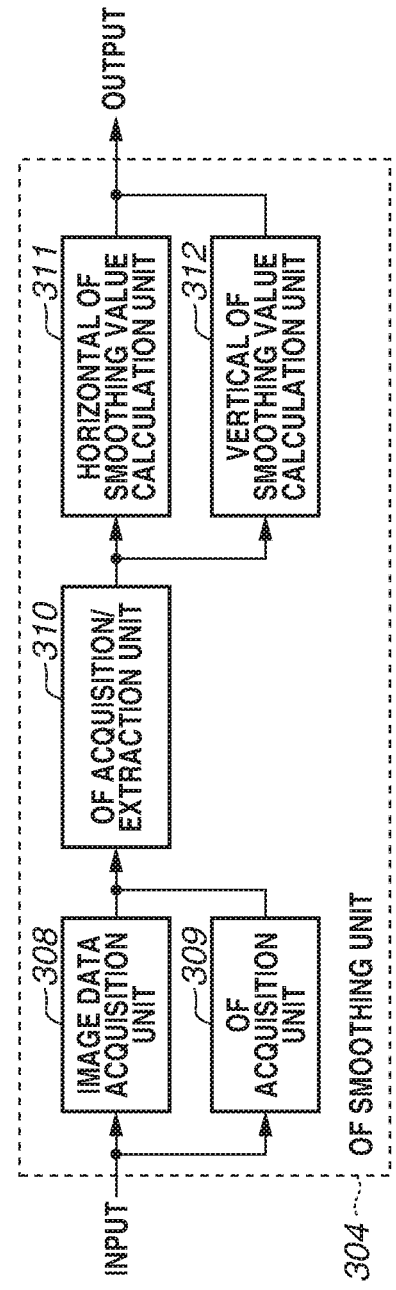

FIGS. 3A and 3B are block diagrams illustrating an internal configuration of the OF derivation unit 110.

The internal configuration and operation of the OF derivation unit 110 according to the fourth exemplary embodiment will be described with reference to FIG. 3A. The OF derivation unit 110 includes an image data acquisition unit 301, an image reduction unit 302, an OF initialization unit 303, an OF smoothing unit 304, an image transformation unit 305, an OF calculation unit 306, an OF enlargement unit 307, an OF calculation unit 306. Data can be input and output via a data line connecting the processing units, and each processing unit is configured to access the RAM 102 illustrated in FIG. 1. Further, the CPU 101 is capable of controlling each module. Next, the operation of each module will be described. The image data acquisition unit 301 acquires target image data and reference image data stored in the RAM 102. The image reduction unit 302 acquires the maximum number of layers (max_lv) and generates reduced images of lv=0 to max_lv. The OF calculation unit 306 calculates the standard deviation of a histogram of the reduced images as a contrast value and outputs the calculated contrast value to the CPU 101. The CPU 101 calculates the contribution θ of the smoothing term based on equation (20) and outputs the calculated contribution θ to the OF calculation unit 306. Further, the CPU 101 sets the variable lv under control to max_lv. The OF initialization unit 303 generates an optical flow in which the motion vector of every pixel is set to 0 by the OF initialization unit 303. The OF calculation unit 306 calculates an optical flow that minimizes the energy function, based on the optical flow generated by the OF initialization unit 303, the lv layer image data on the target image, the warping image, the smoothed optical flow, and the contribution θ of the smoothing term. The basic calculations are performed using equation (22) and an equation used to derive equation (22).

The second and subsequent operations of the OF calculation unit 306 are as follows. The OF calculation unit 306 calculates an optical flow based on the warping image generated by the image transformation unit 305, the warping image, and the smoothed optical flow. The OF enlargement unit 307 enlarges the optical flow of the lv+1 layer and generates an enlarged optical flow. The image transformation unit 305 moves each pixel of the image 12 according to the optical flow and generates a warping image. The OF smoothing unit 304 generates a smoothed optical flow based on the standard deviation, the lv layer image on the target image, and the enlarged optical flow. Details of the processing will be described below. An optical flow for one layer is generated through the processing executed by the processing units 304, 305, 306, and 307. The CPU 101 externally controls pyramid image processing, and in the case in which lv=0, the CPU 101 causes the result obtained by the OF calculation unit 306 to be output to the RAM 102, whereas in the case in which lv≠0, the CPU 101 causes the result to be output to the OF enlargement unit 307. Further, the CPU 101 manages a control variable lv by substituting lv−1 into the control variable lv in one layer of pyramid image processing.

Next, an internal block configuration and operation of the OF smoothing unit 304 will be described in detail below with reference to FIG. 3B. The OF smoothing unit 304 includes an image data acquisition unit 308, an OF acquisition unit 309, an OF acquisition/extraction unit 310, a horizontal OF smoothing value calculation unit 311, and a vertical OF smoothing value calculation unit 312. The OF acquisition unit 309 acquires a plurality of motion vectors corresponding to the pixels neighboring the target pixel. The OF acquisition/extraction unit 310 extracts a pixel having an absolute value difference less than luma_th from the target pixel and determines a set of motion vectors corresponding to the extracted pixel as a set X. A horizontal median value extraction unit calculates the median value of the horizontal components of the motion vectors included in the set X and determines the calculated median value as $u_{smooth}$. A vertical median value extraction unit calculates the median value of the vertical components of the motion vectors included in the set X and determines the calculated median value as $v_{smooth}$. Details are similar to the processing executed in step S6040 in FIG. 6.

The above-described configuration makes it possible to produce a similar effect to that described in the first exemplary embodiment. It should be noted that not every block illustrated in FIGS. 3A and 3B is necessary, and the CPU 101 can execute processing of the blocks. Further, while the example in which the method described in the first exemplary embodiment is applied to the apparatus is described in the present exemplary embodiment, the application is not limited to the above-described application, and the methods described in the second and third exemplary embodiments are also applicable to the apparatus.

A fifth exemplary embodiment will be described. In the second exemplary embodiment, the method of calculating the value of θ from a difference between pixel values is described. In the fifth exemplary embodiment, an example in which the value of θ, i.e., the contribution of the smoothing term, based on differential information about images will be described.

Figure 10:
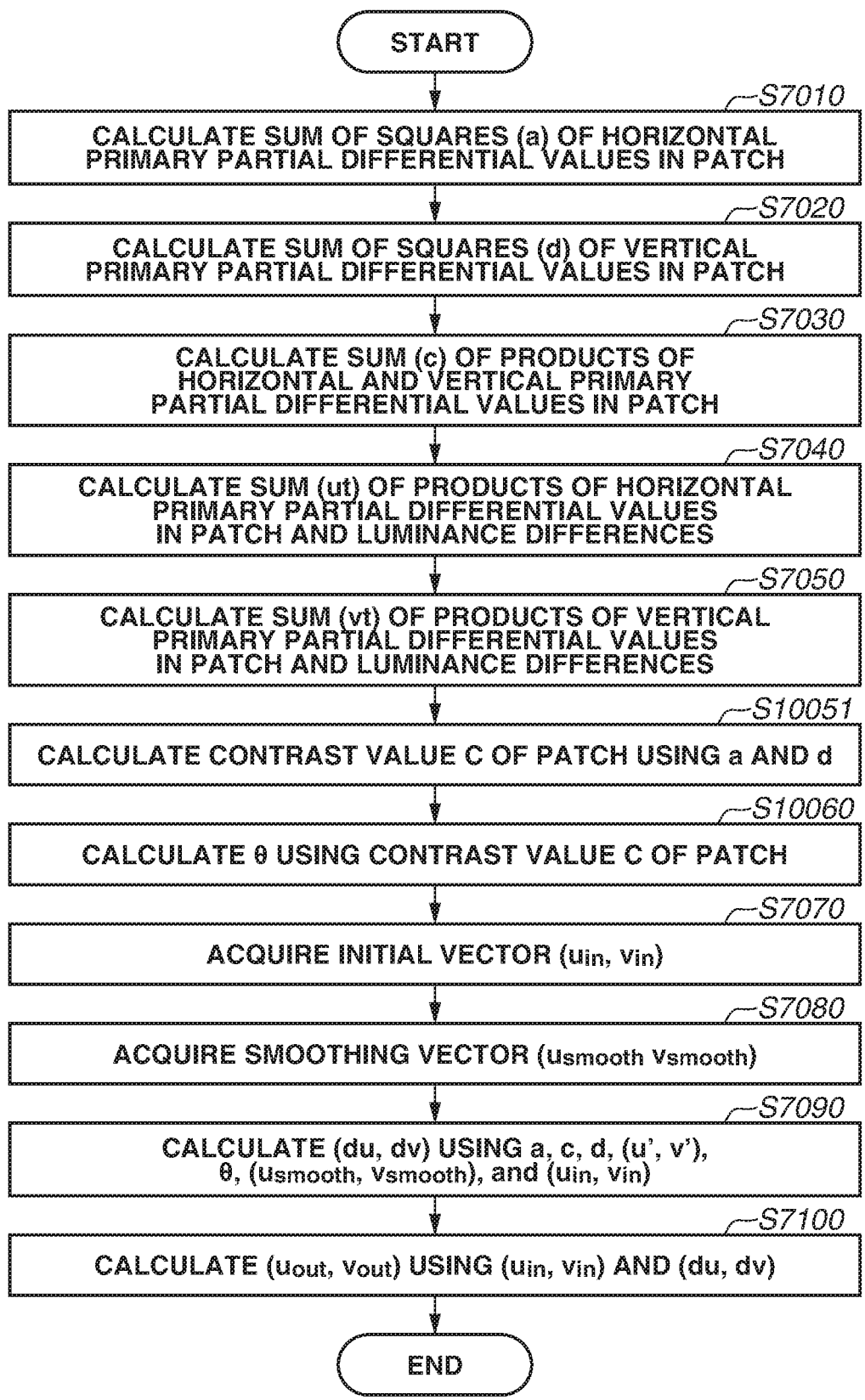
FIG. 10 is a flowchart illustrating a smoothing vector calculation method according to a third exemplary embodiment.

In the present exemplary embodiment, the process of calculating the motion vector of the target pixel that is described above in the second exemplary embodiment with reference to FIG. 8 is replaced with a process illustrated in FIG. 10. The processes in steps given the same reference numerals as those in FIG. 8 are similar to the processes in steps in the second exemplary embodiment. FIG. 10 is a flowchart illustrating the smoothing vector calculation method according to the fifth exemplary embodiment. The process illustrated in FIG. 10 will be described. In FIG. 10, step S10051 is added to the process illustrated in FIG. 8, and step S8060 is replaced with step S10060. The other steps are similar to those in FIG. 8.

In step S10051, the contrast value C of the patch is calculated using the values of "a" and "d". The contrast value C is obtained by the following calculation.

$$C = \sqrt{a+d} \qquad (30)$$

In step S10060, θ is calculated using the contrast value C of the patch. Specifically, θ is calculated using equations (24), (25) and (26). In the present exemplary embodiment, the result of calculation using equation (30) is used as the contrast value, and a similar effect to that in the second exemplary embodiment is produced. If the equation is expanded based on N=2 and r=1, the square-root operation of equation (30) can be omitted. Thus, the equation can be expanded and the calculation can be performed.

The above-described processing control is performed so that an effect similar to that in the second exemplary embodiment is produced.

If the image contrast is high, a result obtained by a primary differentiation is large. Thus, in the present exemplary embodiment, a value obtained by combining horizontal and vertical primary differentiation results is used as the contrast value. The contrast value calculation is not limited to equation (30) and can be performed using equation (31) below.

$$C=\sqrt{\max(a,d)} \qquad (31)$$

In the present exemplary embodiment, the contrast is calculated using the differential values needed in the calculation of the gradient method, so that the calculation efficiency is high.

Other Exemplary Embodiment

Further, the exemplary embodiments are also realizable by executing a process described below. Specifically, software (program) for realizing the above-described functions of the exemplary embodiments described above is supplied to a system or apparatus via a network or various storage media, and a computer (or CPU or micro-processing unit (MPU)) of the system or apparatus reads and executes the program.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s), such as the processing units in FIGS. 3A and 3B and the flowcharts in FIGS. 4 and 6-10. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-097655, filed May 22, 2018, which is hereby incorporated by reference herein in its entirety.

What is claimed is:

1. An image processing apparatus that derives an optical flow which is a set of motion vectors of at least a part of pixels between two input images, the image processing apparatus comprising:
a processor; and
a memory storing instructions that, when executed by the processor, cause the processor to perform as:
an acquisition unit configured to acquire a contrast value of at least one of the two input images, and
a deriving unit configured to derive the optical flow based on the contrast value acquired by the acquisition unit and an energy function including a data term specifying a correlation between the two input images and a smoothing term specifying a degree of smoothing,
wherein the deriving unit searches for a pixel having a pixel value close to a pixel value of a target pixel in a first image of the two input images based on the pixel value of the target pixel and the contrast value, extracts a plurality of motion vectors corresponding to the searched pixel, and determines a motion vector of the target pixel from the plurality of motion vectors using the energy function.

2. The image processing apparatus according to claim 1, wherein the energy function includes a weighted average of the data term and the smoothing term, and
wherein a coefficient of the weighted average is determined based on the contrast value acquired by the acquisition unit.

3. The image processing apparatus according to claim 1, wherein the acquisition unit acquires the contrast value by analyzing a histogram of the input images.

4. The image processing apparatus according to claim 1, wherein the acquisition unit acquires the contrast value based on a difference in pixel value in a region containing a region for generating the data term.

5. The image processing apparatus according to claim 4, wherein the acquisition unit determines a difference between a maximum pixel value and a minimum pixel value in the region as the contrast value.

6. The image processing apparatus according to claim 1, wherein the acquisition unit acquires the contrast value from differential values of pixel values of the input images.

7. The image processing apparatus according to claim 2, wherein the coefficient includes at least a term calculated by raising C to a power of Nr, where N is an order of the energy function, C is the contrast value, and r is a real number in the range of 0.5 to 2 and is a value indicating sensitivity.

8. The image processing apparatus according to claim 1, wherein the deriving unit derives the optical flow by a motion search using template matching.

9. The image processing apparatus according to claim 1, wherein the deriving unit derives the optical flow using a gradient method.

10. The image processing apparatus according to claim 1, wherein the processor further functions as a reduction unit configured to reduce the two input images at a predetermined reduction rate, wherein respective processes by the acquisition unit and the deriving unit are executed in pyramid image processing in which resolutions of the two input images are gradually increased.

11. The image processing apparatus according to claim 10, wherein the deriving unit includes
an enlargement unit configured to generate an enlarged optical flow by enlarging, to a resolution of a layer that is in execution, an optical flow generated in a layer of a next greater reduction rate than the layer that is in execution, and
a calculation unit configured to calculate the energy function using the enlarged optical flow.

12. The image processing apparatus according to claim 11,
wherein the deriving unit further includes a transformation unit configured to generate a warping image by moving a first input image of the two input images based on the enlarged optical flow, and
wherein the calculation unit calculates the energy function by expressing a difference between the first input image and the warping image as energy.

13. The image processing apparatus according to claim 1, wherein the deriving unit generates the optical flow by setting a target pixel using one of the two input images as a reference and determining, as a motion vector of the target pixel, a motion vector that minimizes the energy function from a motion vector group corresponding to the target pixel.

14. The image processing apparatus according to claim 2, wherein the coefficient is calculated for each pixel.

15. The image processing apparatus according to claim 2, wherein the deriving unit calculates the coefficient based on differential information about the two input images.

16. The image processing apparatus according to claim 1, wherein the processor further functions as an input unit configured to input three or more images,
wherein the acquisition unit and the deriving unit process two images among the three or more images.

17. The image processing apparatus according to claim 16, wherein the three or more images are frames constituting a moving image.

18. An image processing method for deriving an optical flow which is a set of motion vectors of at least a part of pixels between two input images, the method comprising:
acquiring a contrast value at least one of the two input images; and
deriving the optical flow based on the acquired contrast value and an energy function including a data term specifying a correlation between the two input images and a smoothing term specifying a degree of smoothing of the motion vectors between the two input images,
wherein deriving comprises searching for a pixel having a pixel value close to a pixel value of a target pixel in a first image of the two input images based on the pixel value of the target pixel and the contrast value, extracting a plurality of motion vectors corresponding to the searched pixel, and determining a motion vector of the target pixel from the plurality of motion vectors using the energy function.

19. A non-transitory computer-readable storage medium storing instructions that, when executed by a computer, cause the computer to perform a method comprising:
acquiring a contrast value of an input image; and
deriving an optical flow which is a set of motion vectors of at least a part of pixels between two input images including the input image, based on the acquired contrast value and an energy function including a data term specifying a correlation between the two input images and a smoothing term specifying a degree of smoothing of the motion vectors between the two input images,
wherein deriving comprises searching for a pixel having a pixel value close to a pixel value of a target pixel in a first image of the two input images based on the pixel value of the target pixel and the contrast value, extracting a plurality of motion vectors corresponding to the searched pixel, and determining a motion vector of the target pixel from the plurality of motion vectors using the energy function.

* * * * *